March 15, 1960 C. F. QUATE Re. 24,794

LOW NOISE VELOCITY MODULATION TUBE

Original Filed June 12, 1952 4 Sheets-Sheet 1

INVENTOR
C. F. QUATE

BY Hugh S. Wertz
ATTORNEY

LOW NOISE VELOCITY MODULATION TUBE

Original Filed June 12, 1952 4 Sheets-Sheet 2

INVENTOR
C. F. QUATE
BY Hugh S. Wertz
ATTORNEY

LOW NOISE VELOCITY MODULATION TUBE

Original Filed June 12, 1952 4 Sheets-Sheet 3

INVENTOR
C. V. QUATE

BY Hugh S. Wertz
ATTORNEY

LOW NOISE VELOCITY MODULATION TUBE

Original Filed June 12, 1952 4 Sheets-Sheet 4

INVENTOR
C. F. QUATE

BY Hugh S. Wertz
ATTORNEY

United States Patent Office

Re. 24,794
Reissued Mar. 15, 1960

24,794

LOW NOISE VELOCITY MODULATION TUBE

Calvin F. Quate, Berkeley Heights, N.J., assignor to Bell Telephone Laboratories, Incorporated, New York, N.Y., a corporation of New York Original No. 2,792,518, dated May 14, 1957, Serial No. 293,186, June 12, 1952. Application for reissue April 4, 1958, Serial No. 730,034

22 Claims. (Cl. 315—3.5)

Matter enclosed in heavy brackets [ ] appears in the original patent but forms no part of this reissue specification; matter printed in italics indicates the additions made by reissue.

This invention relates to microwaves devices and more particularly to such devices which employ velocity modulation of an electron stream in accordance with signal information to secure signal amplification.

A general object of the invention is to improve the noise figure of such devices.

A more specific object is to reduce the effect of the space charge waves which are set up by the thermal fluctuations at the source of electron stream and which propagate to the point of signal modulation of the electron stream.

The invention has primary application to velocity modulation devices which utilize the interaction between an electron stream and a traveling electromagnetic wave to secure amplification of the traveling wave, and which are now commonly designated as traveling wave tubes. Accordingly, the invention will be described with particular reference to such traveling wave tubes, although the principles of the invention are applicable generally to devices which utilize the velocity modulation of electron streams and are thereby susceptible to noise space charge waves of the kind described above.

In its usual form, a traveling wave tube is a vacuum tube in which an electromagnetic wave is made to propagate along a slow wave circuit at the same time that an electron stream is projected past the slow wave circuit in coupling relation with the electromagnetic wave. To serve as the electron source, there is provided an electron gun positioned beyond the input end of the slow wave circuit. Such an electron gun customarily includes an electron emissive surface, or cathode, and an electrode system which includes beam forming and accelerating electrodes for focussing the electron stream preliminary to its projection past the wave circuit. In the past, in order to achieve the maximum stream densities along the path of flow past the wave circuit, it has been common to include an electron gun which has a cathode which produces initially an electron beam having a large cross section and an electrode system which converges the flow into an electron beam of smaller cross section for travel past the wave circuit. Alternatively, for simplification of the focussing problems, it has been a less frequent practice to utilize an electron gun which includes a cathode which provides initially a beam of the desired cross section for travel past the wave circuit and an electrode system for maintaining plane electron flow.

It has now been found that, in traveling wave tubes where noise figure is an important consideration, it is advantageous to employ an electron gun which includes a cathode which provides initially a beam of small cross section relative to that desired for projection past the wave circuit and an electrode system which diverges the flow into an electron beam of the desired cross sectional dimensions and then collimates the electron beam for plane flow past the wave circuit.

By utilizing divergent flow along most of the path between the cathode and the input end of the wave circuit, it is possible to minimize the amplitude of the space charge waves which are set up by the thermal fluctuations just off the cathode and which propagate to the input end of the wave circuit and there act in the manner of input waves, thereby effecting signal degradation. For example, calculations indicate that an improvement in noise level of approximately 6 db can be expected by producing initially an electron beam of diameter substantially one-ninth that desired for the electron beam to be projected past the wave circuit.

For example, for use in a traveling wave tube which employs a helix as the slow wave circuit, the electron source is designed to provide initially an electron beam whose diameter is less than one ninth the internal diameter of the helix and prior to projection past the helix, the flow is made to diverge until the electron beam attains a diameter substantially equal to the internal diameter of the helix, and is then collimated for travel past the helix.

The invention will be better understood from the following more detailed description taken in conjunction with the accompanying drawings in which.

Figure 3:
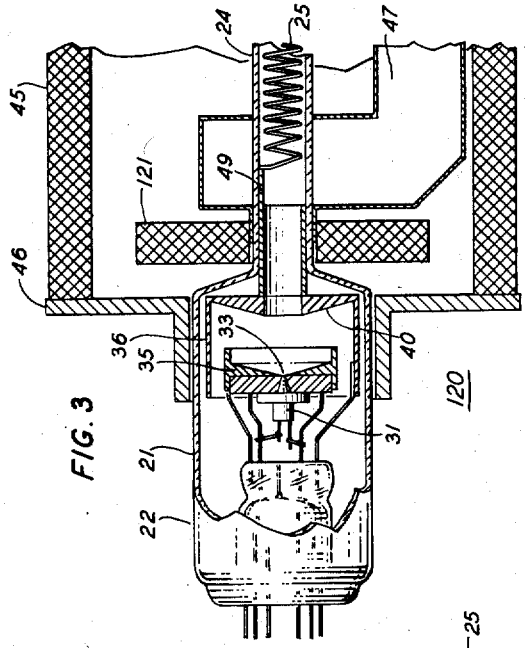
Figure 4:
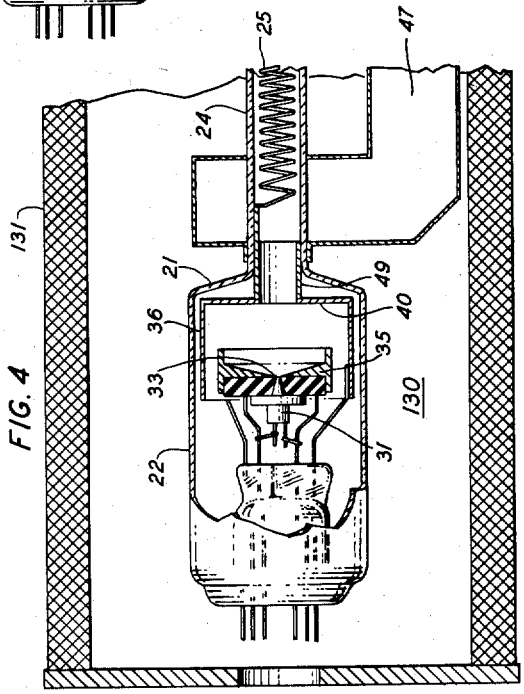

Figs. 3 and 4 each shows fragments of traveling wave tubes which include different forms of electron guns suitable for providing divergent flow as is characteristic of the invention, and Figs. 5 through 10 are graphical representations which will be useful in a description of the principles of the invention.

Figure 2:
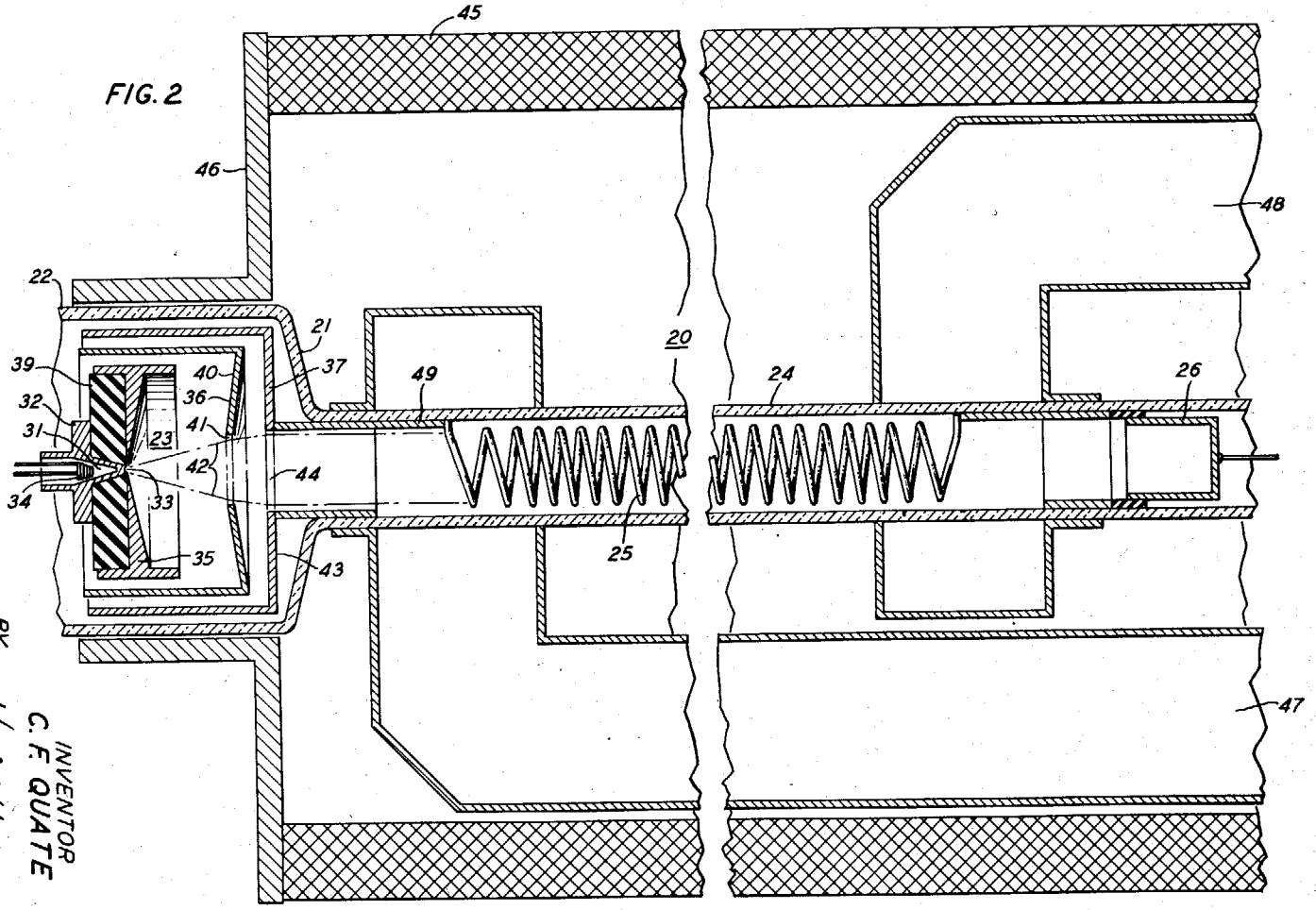
Fig. 2 is a longitudinal section of a helix type traveling wave tube which incorporates an electron gun suitable for providing divergent flow in accordance with the principles of the invention, and which employs an electrostatic lens for collimating the electron stream.

Before describing in detail the specific embodiments of the invention shown in Figs. 2, 3 and 4, it will be advantageous to analyze the principles of the invention.

Figure 1:
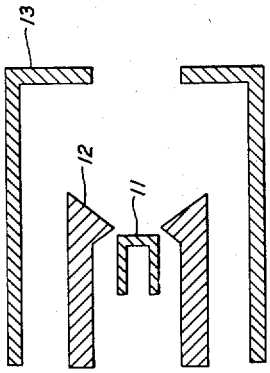
Fig. 1 shows in schematic form a prototype electron gun for use in describing the principles of the invention.

This will be done with reference to the prototype electron gun shown schematically in Fig. 1, which comprises essentially a cathode 11, a beam forming electrode 12, and an accelerating anode 13. In operation, the cathode is heated by suitable heating means (not shown) and electrons are emitted from its surface. The electrons emanating from the cathode 11 are formed into an electron beam of desired configuration by the action of the electrode system comprising the beam forming electrode 12 and the accelerating anode 13. This action is determined by the geometry and electrostatic field characteristic of this electrode system. When the electron gun is embodied in a traveling wave tube, the electron beam is projected beyond the anode 13 and past a suitable wave circuit under the influence of accelerating fields as will be described more fully below. The existence in traveling wave tubes of noise space charge waves set up by thermal fluctuations just off the surface of the cathode and which propagate to the input of the wave circuit has been experimentally demonstrated. This work is found described in an article by C. C. Cutler and C. F. Quate entitled "Verification of transit time reduction of noise," Physical Review, vol. 80, pp 875–878, December 1950. However, the nature of the noise space charge waves propagating in the accelerating region from the cathode 11 to the accelerating anode 13 of the electron gun has not hitherto been adequately understood. Previous studies have made use of equations governing space charge flow in a one dimensional plane diode. The actual beam, however, is generally two dimensional in cross section and, equally important, it has, in the past, generally converged in conical flow from the cathode 11 to the anode 13 of the electron gun.

The equations applicable to circularly cylindrical or conical flow in an accelerating region are too complex for solution. However, the following analysis will solve the equations of electron motion in one dimensional spherical coordinates so as to study the effect of convergence or divergence of the beam. By this approach, there can be obtained a better understanding of the operation of tubes which employ two dimensional conical flow. In this way, it is shown that divergent flow from the cathode 11 to the anode 13, as is contemplated for the practice of the invention, excites space charge waves in the drift region beyond anode 13 of considerably less amplitude than either plane or convergent flow.

In this analysis, there is studied the space charge waves in spherical coordinates with the D.-C. velocity appropriate to space charge limited flow. First, there are set up the equation of divergence for the electric field, the continuity equation for the current density, and the force equation for the velocity. These are, in turn, $$\nabla \cdot E = -\rho/\epsilon_0 \quad (1)$$

$$\nabla \cdot i = -j\omega\rho \quad (2)$$

$$\frac{dv}{dt} = -\eta E \quad (3)$$

where

E=the electric field acting on the electrons in the beam
i=the conduction current density
v=the velocity of electrons in the beam
$\rho$=the charge density in the beam
f=the frequency under consideration
$\omega = 2\pi f$
$\epsilon_0$=the dielectric constant of the medium
$\eta$=the charge-mass ratio of an electron Now, by postulating that Equations 1, 2, and 3 have wave-like solutions, we look for such solutions by allowing $$v = u_0 + v_1 e^{-j\beta r + j\omega t} \quad (4)$$

and $$E = E_0 + \frac{E^1}{r^2} e^{-j\beta r + j\omega t} \quad (5)$$

where $u_0$=D.-C. beam velocity
$\beta = \omega/u_0$
$E_0$=D.-C. electric field between the accelerating anode and the cathode From these relationships, it can be shown that $$r^2 \frac{\partial^2 \Psi}{\partial r^2} + 2r \frac{\partial \Psi}{\partial r} - \frac{\eta I_0}{4\pi\epsilon_0 u_0^3} \Psi = 0 \quad (6)$$

where $\psi = u_0 v_1$.

Then by substituting $$x = \frac{v}{r_0}$$

where $r_0$ is the radius of the cathode, and by utilizing the D.-C. equation of space charge limited flow described in an article by I. Langmuir and K. Blodgett, entitled "Currents limited by space charge between concentric spheres" Physical Review, vol. 24, pp. 49–59, July 1924, that $$\frac{\eta I_0}{4\pi\epsilon_0 u_0^3} = \frac{2}{9} \frac{1}{\alpha^2} \quad (7)$$

where $(\alpha)^2$ is expressed in series form by $$\alpha = 1nx - .3(1nx)^2 + .075(1nx)^3 + \quad (8)$$

Equation 6 can be written as $$\frac{\partial^2 \Psi}{\partial x^2} + \frac{2}{x} \frac{\partial \Psi}{\partial x} + \frac{2}{9} \frac{1}{x^2 (\alpha)^2} \Psi = 0 \quad (9)$$

The solution of Equation 9 gives the nature of the space charge waves propagating in the cathode to anode region of the electron gun for space charge limited flow.

Figure 5:
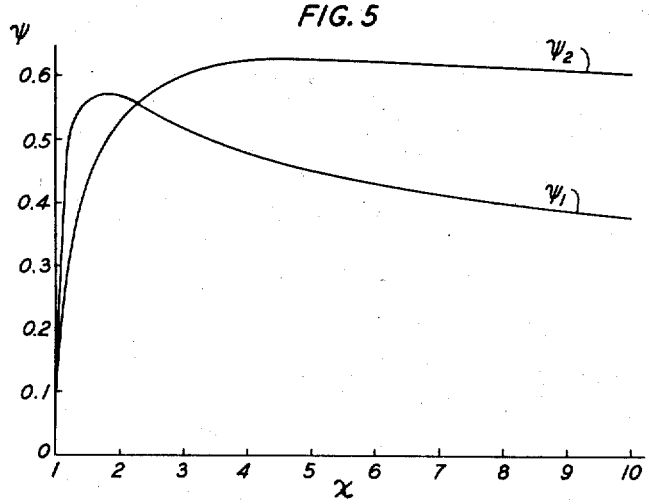
Figure 6:
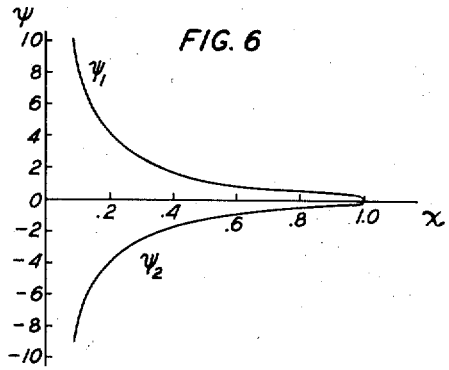

This equation has been solved numerically and its two solutions $\psi_1$ and $\psi_2$ are presented graphically in Figs. 5 and 6, for divergent flow and convergent flow, respectively.

The quantities which are of principal interest in discussing the space charge waves are the A.-C. velocity $v_1$ which is equal to $$\frac{\psi}{u_0}$$

and the A.-C. current $i_1$ which is proportional to $$\frac{\partial \psi}{\partial r}$$

From Equation 7, it can be seen that $u_0$ is proportional to $(\alpha)^{2/3}$. Accordingly, the A.-C. velocity $v_1$ is proportional to $$\frac{\psi}{(\alpha)^{2/3}}$$

Figure 7:
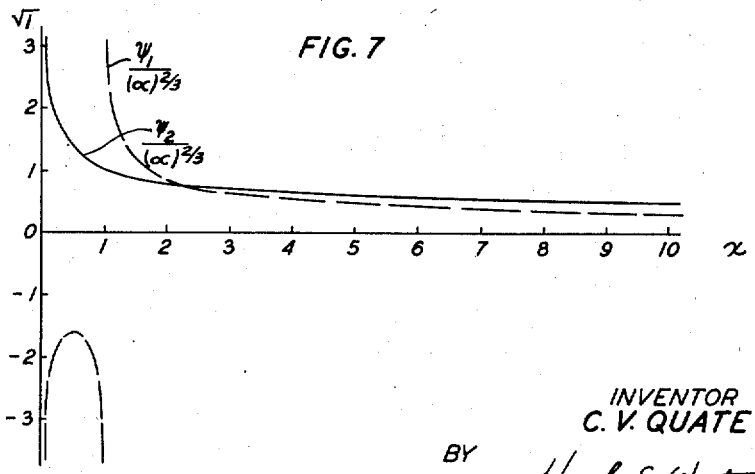

In Fig. 7, $v_1$ is shown plotted against x where x is the ratio of the radius of the electron beam at various points along the length of the beam to its initial radius for $$\frac{\psi_1}{(\alpha)^{2/3}}$$

and $$\frac{\psi_2}{(\alpha)^{2/3}}$$

Figure 8:
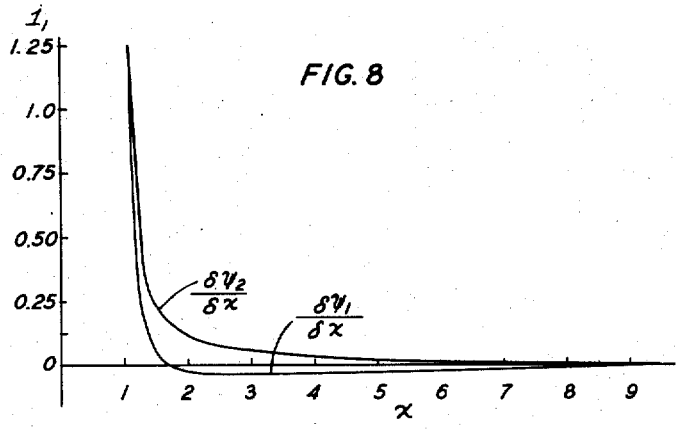
Figure 9:
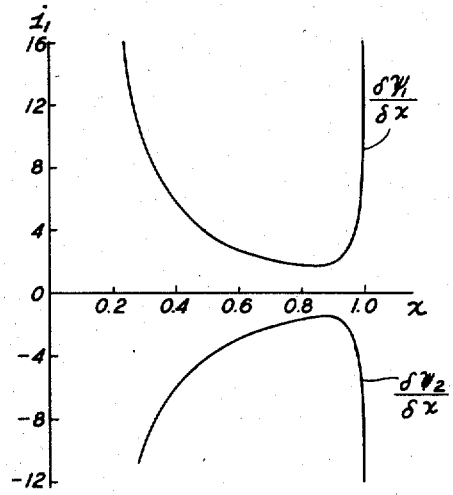

In Figs. 8 and 9, respectively, the A.-C. current $i_1$ is plotted against x for the functions $$\frac{\partial \psi_1}{\partial x}$$

and $$\frac{\partial \psi_2}{\partial x}$$

for convergent and divergent flow, respectively.

It will be helpful to consider the noise space charge waves set up by the thermal fluctuations at the cathode in a manner analogous to the plane case analyzed by J. R. Pierce, in his book "Traveling Wave Tubes" chapter X, Van Nostrand, New York (1950). In the plane case, it was shown that in space charge limited flow only the A.-C. thermal velocity at the potential minimum contributed to the space charge waves. Hence in the spherical case, since it is substantially equivalent to the plane case near the cathode, we shall consider the boundary conditions at the cathode to include only A.-C. thermal velocity. From Fig. 7, it can be seen that there must be excluded the $\psi_1$ solution since it becomes infinite at the cathode. Accordingly, only the $\psi_2$ solution need be considered further.

Figure 10:
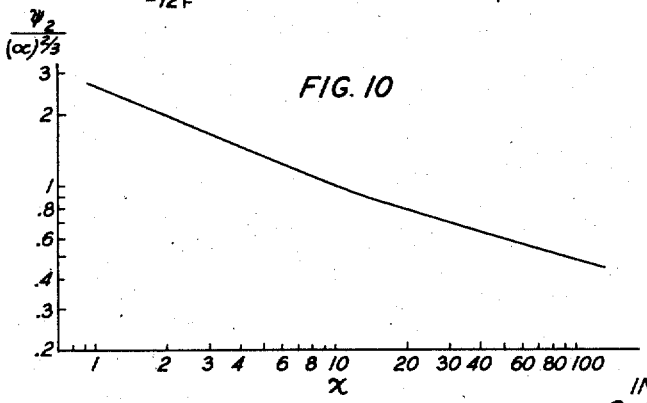

In Fig. 10, there is plotted $\psi_2/\alpha^{2/3}$ versus x, where as above, x is the ratio of the radius of the electron beam to the radius of the electron beam as it left the cathode. This gives the ratio of the A.-C. velocity at the anode to the initial A.-C. velocity at the cathode. For the plane case, this ratio is unity (i.e. the velocity at the anode is equal in magnitude to the velocity at the cathode). Fig. 10 further provides a direct comparison of the A.-C. velocity at the anode for spherical geometry to that for plane geometry.

There can now be examined the space charge waves set up in the drift region beyond the anode which propagate to the input end of the wave circuit. In Fig. 8, there is plotted $$\frac{\partial \psi}{\partial x}$$

which is proportional to A.-C. current density, for values of x greater than one, which is the diverging beam case. It is to be noted that the A.-C. current for the $\psi_2$ solution approaches zero for values of x near 6. It can therefore be concluded that with a sufficiently diverging beam the A.-C. current at the anode can be neglected and only the A.-C. velocity contributes to setting up the space charge waves in the drift region beyond. Consequently, it is possible to consider the characteristic shown in Fig. 10 as a measure of the ratio of the noise figure of the spherical beam to that of the plane beam. Thus, for example, we see that for a beam which diverges from a cathode so as to have a diameter at the anode nine times that at the cathode the noise figure is improved by a factor of 6 db, which represents a rather considerable improvement.

Although the analysis set forth above has been specifically directed at the case of a solid beam of circular cross section, the principles established thereby are not necessarily limited to this specific kind of flow. In fact, the same improvement in noise figure can be attained for beams of various other cross sectional forms, as, for example, beams of rectangular cross section, or annular cross section.

Various forms of electron guns are known which are suitable for providing divergent flow of the electron stream between cathode and anode for use in the practice of the invention. For example, United States Patent 2,268,196 issued to J. R. Pierce on December 30, 1941, discloses electron guns suitable for such divergent flow. Moreover, for a complete description of the design principles applicable to the design of suitable electron guns, reference is made to a book entitled "Theory and Design of Electron Beams" by J. R. Pierce, published by Van Nostrand Company, Inc., New York (1949). However, it had not been appreciated hitherto that in traveling wave tubes the advantage which can be realized in the form of improved noise figure by such divergent flow can outweigh the disadvantages of lower stream densities and slightly more exacting focussing requirements.

With reference now to specific embodiments in accordance with the invention, in Fig. 2, there is shown, by way of example, a helix-type traveling wave tube 20 which is characterized by an electron gun which provides divergent flow to the electron beam between the cathode and the accelerating anode prior to its projection beyond the accelerating anode for travel past the slow wave circuit. An evacuated envelope 21, which for example is of glass, has at the left hand end an enlarged end portion 22 wherein is housed the electron gun 23 and an elongated portion 24 wherein is enclosed the helix wave circuit 25.

At the right hand end of the elongated portion, there is disposed a target electrode 26 disposed in a collecting relationship for electrons projected from the electron gun 23. The electron gun 23 and target electrode 26 define therebetween a path of flow for the electron beam, which is symmetric about the longitudinal axis of the envelope. The helix wave circuit 25 extends coaxial with this longitudinal tube axis in the path of flow.

The electron gun 23 comprises an electron source or cathode 31 and an electrode system. As shown, the cathode is of the indirectly heated type and comprises a metallic heater compartment 32 having a right hand end portion 33 thereof which is coated on the outside surface with a suitable thermionic material, and a heater filament 34 within the compartment. To achieve a solid circularly cylindrical electron beam for projection within the helix wave circuit, the coated end portion is circular. Alternatively, the thermionic material can be applied in an annular coating for providing a hollow circularly cylindrical electron beam for travel past the helix wave circuit. The electrode system comprises a beam forming electrode 35, a first accelerating anode 36, and a second accelerating anode 37, each supported in axial alignment with the cathode. The beam forming electrode 35 is a metallic element which is apertured for passage of the electron beam therethrough and which extends transversely from the path of flow having a configuration which will provide suitable electrostatic fields. An insulating ring 39 keeps the cathode 31 and beam forming electrode 35 spaced apart. By means of suitable voltage sources, a potential difference may be created between the cathode 31 and the beam forming electrode 35 to effect a measure of control of the intensity of the beam current. The first accelerating anode 36 is a circularly cylindrical metallic jacket which is supported to fit around, although spaced apart from, the beam forming electrode 35. The anode 36 includes an end plate 40 which extends transverse to the path of electron flow and has a circular aperture 41 of diameter substantially larger than the diameter of the thermionic cathode surface 33 for passage of the electron flow therethrough. This first anode is maintained at a positive accelerating potential with respect to the cathode 31 and beam forming electrode 35. The beam forming electrode 35 and the first accelerating anode 36 together form an electrostatic lens for the control of the electron beam. The configuration of the left end surface of the end member 40 of the accelerating anode 36 and right end surface of the beam forming electrode 35, together with the accelerating potential being applied, determines the path of travel of electrons after emission from the thermionic cathode surface. In accordance with the invention, the electrostatic lens formed by the beam forming electrode 35 and the first accelerating anode 36 is made diverging. In this embodiment, the appropriate surfaces are designed to make the electron beam diverge along this path of travel so that the circular electron beam which, initially as it leaves the circular thermionic surface 33, has a diameter substantially equal to that of the thermionic surface has, by the time it passes through the circular aperture 41 in the end member 40 of the accelerating anode 36, a diameter substantially larger, as for example, nine times as large. The envelope of the electron flow has been shown by the broken lines 42. The particular design principles applicable are well known to workers in the electron optics art, and reference can be had to the above-mentioned Pierce book for a detailed discussion of these principles. The second accelerating anode 37 similarly comprises a metallic jacket which fits around, and is spaced apart from, the first accelerating anode 36. It is similarly provided with an end plate 43 which extends transverse to the path of electron flow and has a circular aperture 44 for passage of the electron flow therethrough in the manner of the first accelerating anode. This anode is maintained positive with respect to the first accelerating anode by means of suitable voltage sources. The anodes 36 and 37 together form an electrostatic lens which colimates the divergent circular electron beam into plane flow at substantially the increased diameter the beam has attained by the time it passes through the aperture 41 in the end plate 40 of the first accelerating anode 36. To achieve this collimating effect, it is important that the configuration of the right end surface of the first accelerating anode 36 and the left end surface of the second accelerating anode 37 be properly designed. The design of such a collimating lens is well known to workers in the electron optics art, and again, the principles can be found described in the above-mentioned Pierce book. The sum effect of the electrode system is to transform the circular beam of a diameter which is relatively small compared to the internal diameter of the helix wave circuit, as it leaves the electron source, into a circularly cylindrical beam of a diameter substantially equal to the internal diameter of the helix wave circuit for travel beyond the apertured end plate of the second accelerating anode and past the helix wave circuit.

It is of course necessary to provide suitable supporting structure for the various elements described, together with various lead-in connections to establish the operating potentials necessary. However, in the interest of simplicity, and since little would be gained by a description of such details, these have been omitted.

To help keep the beam plane in its travel along the relatively longer path of flow beyond this plate, the remaining portion of the path of flow is immersed in a strong axial magnetic field. For example, the strength of this magnetic field can be adjusted to provide Brillouin type flow past the wave circuit. The principles of such flow can be found described on pages 152 et seq. of the afore-mentioned Pierce book. By such flow, radial components acting on the stream are minimized. This magnetic field can be established, for example, by the solenoid 45 disposed, as shown in Fig. 2, about the elongated portion 24 of the tube envelope. To minimize the effect of this magnetic field on the operation of the electron gun, it is advantageous to shield the electron gun from this field. To this end, there is provided an apertured transverse soft iron plate 46 which fits around the tube envelope in alignment with the end plate 43 of the second accelerating anode 37, which for such purposes similarly can be of soft iron. There results a magnetic shield which keeps the electron gun relatively magnetic field free, while the remainder of the tube is immersed in the longitudinal magnetic field.

The helix wave circuit 25, which is a plurality of wavelengths long at the operating frequency, is positioned along a substantial portion of the path of flow extending beyond the accelerating anode 37. The circularly cylindrical electron beam preferably is confined to the interior of the helix, but flowing closely past the turns of the helix. This helix wave circuit can be of the kind well known in the traveling wave tube. Alternatively, it is contemplated that there may be employed a multipitch helix of the kind described in my copending application, Serial No. 220,416 filed April 11, 1951, *now U.S. Patent 2,908,844, issued October 13, 1959.* Input waves are coupled to the upstream end of the helix by way of the input wave guide 47 and output waves are abstracted at the downstream end of the wave guide by way of the output wave guide 48. Both wave guides can be of conventional rectangular cross section, and each is apertured for passage of the tube envelope therethrough. For improved coupling to the respective wave guides, it is advantageous to employ microwave transducers to effect energy interchange at the respective ends of the helix, which, for example, can be of the kind described in United States Patent 2,575,383, which issued to L. M. Field on November 20, 1951. Such microwave transducers customarily include a metallic coupling strip in conjunction with a helix portion of gradually increasing pitch. In operation the helix is maintained usually at the same potential of the second accelerating anode by a connection thereto which comprises a non-magnetic conductive cylindrical sleeve 49, as shown in Fig. 2.

The basic operation of the traveling wave tube is well understood, being fully described in the afore-mentioned Field patent. Accordingly, since the basic operation remains unaffected by the use of divergent flow as described, further description thereof seems unnecessary. It is, however, true that although the same principles of operation are applicable, there is effected a considerable improvement in noise figure.

As should be evident to a worker in the electron optics art, various alternative arrangements can be employed for collimating the divergent electron beam into a plane electron beam for flow past the wave circuit in tubes constructed in accordance with the principles of the invention. In particular, Fig. 3 shows the electron gun portion of a traveling wave tube 120 which employs magnetic focussing for collimating the divergent electron flow. In other respects, this tube 120 is similar to tube 20 shown in Fig. 2, and, accordingly, for simplicity, like reference numerals are used to employ corresponding elements, and repetition of their various functions is avoided. However, the electrostatic lens formed by the first and second accelerating anodes 35 and 36 in the electron gun 23 of the tube 20, shown in Fig. 2, is replaced by a magnetic lens. For this purpose, for example, a solenoid 121 is provided, preferably disposed external to the tube envelope 21, along the initial portion of the electron path extending beyond the apertured end plate 40 of the accelerating anode 36 of the electron gun. This solenoid 121 creates a longitudinal magnetic field along its adjacent portion of the electron path, which combines with the longitudinal magnetic field provided by the solenoid 45 which still preferably is used, as described above, to provide Brillouin type flow past the wave circuit. In the region where the fields of the two solenoids combine, the cumulative effect is strong enough to transform the divergent electron flow into plane electron flow in accordance with principles found described in the above-mentioned Pierce book. Thereafter, the field of the solenoid 45 keeps the electron flow plane for the substantially longer remaining portion of the path of flow. As in tube 20 of Fig. 2, an apertured transverse end plate of soft iron disposed external to the tube envelope is aligned with a soft iron end plate 40 of the accelerating anode 36 for shielding the electron gun from the magnetic fields beyond. The operation of the tube 120, embodying the kind of gun just described, is similar to that of tube 20 in Fig. 2.

Fig. 4 shows an electron gun portion of a traveling wave tube 130 which employs still another possible form of collimating arrangement consistent with the principles of the invention. In this case, substantially the whole tube is immersed in a longitudinal magnetic field provided by an externally disposed solenoid 131. Again, the electron gun comprises a cathode source 33 of an electron stream of relatively small transverse dimensions and an electrode system comprising, as before, a beam forming electrode and an accelerating anode for forming the electrons emitted from the source into an electron beam. In this case, by choice of beam accelerating potentials and magnetic field strength in accordance with the principles set forth on pages 152 through 155 of the above-identified Pierce book which relates to the Brillouin type case of a point source immersed in a longitudinal uniform magnetic field, the electrons can be formed into flow which is divergent in the region between the cathode source 33 and the accelerating anode 36, and plane for travel along that portion of the electron path extending beyond the accelerating anode 36, as desired for the practice of the invention. The wave circuit 25 again is positioned in coupling relationship with this plane electron beam.

It is to be understood that the various embodiments described above are merely illustrative of the principles of the invention. Still further arrangements can be devised by one skilled in the art without departing from the spirit and scope of the invention. For example, although the invention has been described with particular reference to a traveling wave tube which employs a helix wave transmission circuit, the principles are applicable to traveling wave tubes which employ various other forms of wave transmission circuits. Moreover, it is possible to apply the principles of the invention to various other forms of velocity modulation tubes; for example, to velocity modulation tubes of the kind known in the microwave art as klystrons which employ standing waves for modulating the electron beam in its path of forward travel in accordance with signal information.

It is to be noted that the expression "plane" when used in connection with an electron beam describes an electron beam which substantially neither diverges nor converges, and without reference to any specific cross-sectional configuration. Additionally the expression "circularly cylindrical" when used in connection with an electron beam describes a plane electron beam of substantially circular cross-section.

What is claimed is:

1. In a radio frequency device, an electron gun and a target electrode defining therebtween a path of electron flow, the electron gun comprising an electron emissive surface, means for forming the electron flow emitted from said surface into a divergent electron beam, and means for collimating the divergent electron beam into a plane electron beam having an electron density less than one-half the density of the electron flow at said emissive surface, means for maintaining the electron beam substantially plane throughout the remaining portion of the path of electron flow, and a wave transmission circuit positioned along a substantial part of the remaining portion of the electron flow path in coupling relation with the plane electron beam for modulating the plane electron beam in accordance with signal information.

2. In a radio frequency device, an electron gun and a target electrode defining therebetween a path of electron flow, the electron gun comprising an electron emissive surface, electrode means for forming the electron flow emitted from said surface into a divergent electron beam, and means for collimating the divergent electron beam into a plane electron beam having an electron density substantially less than the density of the electron flow at said emissive surface, and magnetic means for maintaining the electron beam substantially plane throughout the remaining portion of the path of electron flow.

3. In a radio frequency device, an electron gun and a target electrode defining therebetween a path of electron flow, the electron gun comprising an electron emissive surface, electrode means for forming the electrons emitted from said surface into a diverging electron beam, and means for collimating the divergent electron beam into a plane electron beam whose axis is normal to the electron emissive surface, magnetic means for maintaining the electron beam substan ially plane throughout the remaining portion of a path of electron flow, and means along said remaining portion of the path of electron flow for modulating the velocity of electrons in their path of forward travel in acordance with signal information.

4. In a radio frequency device, a source of electrons including an electron emissive surface of predetermined area, electrode means for forming the electrons emitted from said surface into a divergent electron beam, means for collimating said divergent electron beam into a plane electron beam having a cross-sectional area substantially greater than the area of said emissive surface, and means for velocity modulating the plane electron beam in its path of forward travel in accordance with signal information.

5. In a radio frequency device a source of an electron beam of a first diameter, means for forming said electron beam into a diverging electron beam, means for collimating said diverging electron beam into a cylindrical electron beam of a diameter at least several times the first diameter, and means for velocity modulating the electron beam in its path of forward travel in accordance with signal modulation.

6. In a radio frequency device, a source of an electron beam of a first diameter, electrode means for forming said electron beam into a diverging electron beam, means for collimating said diverging electron beam into a cylindrical electron beam of a diameter at least several times the first diameter, and a wave transmission circuit positioned in coupling relation with the cylindrical electron beam for modulating the cylindrical electron beam in its path of forward travel in accordance with signal information.

7. In a radio frequency device which utilizes the interaction between a traveling electromagnetic wave and an electron stream, an electron gun and a target electrode defining therebetween a path of electron flow, and a wave circuit positioned along said path for propagating electromagnetic waves in coupling relation with the electron flow, and characterized in that the electron gun comprises an electron emissive surface of predetermined area, electrode means for forming the electrons emitted from said surface into a diverging electron beam, and means for collimating the diverging electron beam into a plane electron beam having a cross-sectional area substantially greater than the area of said emissive surface for projection past the wave circuit.

8. A radio frequency device according to claim 7 which includes means for immersing the wave circuit in a magnetic field extending parallel to the path of electron flow for minimizing radial components of the plane electron beam in its flow past the wave circuit.

9. In a radio frequency device which utilizes the interaction between a traveling electromagnetic wave and an electron stream, an electron gun and a target electrode defining therebetween a path of electron flow, and a wave circuit positioned along said path for propagating electromagnetic waves in coupling relation with the electron flow, and characterized in that the electron gun comprises an electron emissive surface of predetermined area, a beam forming electrode, a first anode cooperating with said beam forming electrode for diverging the electron flow emitted from the electron emissive surface, and lens means positioned along the path of flow in the region between the emissive surface and the wave circuit, for collimating the electron stream into a plane electron beam having a cross-sectional area substantially greater than the area of said emissive surface for travel past said wave circuit.

10. A radio frequency device according to claim 9 in which the lens means includes a second anode.

11. A radio frequency device according to claim 9 in which the lens means includes magnetic means.

12. In a radio frequency device which utilizes the interaction between an electron stream and a traveling electromagnetic wave, an electron gun and a target electrode defining therebetween a path of electron flow, and a helical wave circuit positioned along said path for propagating electromagnetic waves in coupling relation with the electron flow, and characterized in that the electron gun comprises an electron emissive surface of predetermined area for providing a circular beam having a diameter substantially smaller than the internal diameter of the helix, beam forming means along the path for providing divergent flow for the beam emitted from the emissive surface, and lens means along the path for collimating the beam to a cylindrical beam having a cross-sectional area substantially larger than the area of said emissive surface and of a diameter substantially equal to the internal diameter of the helical wave circuit for projection past the helical wave circuit.

13. A radio frequency device according to claim 12 in which the lens means includes electrostatic means.

14. A radio frequency device according to claim 12 in which the lens means includes magnetic means.

15. In a radio frequency device, a helix wave transmission circuit, a source of an electron beam including an electron emissive surface of predetermined area, said predetermined area being small relative to the cross sectional area of the cylinder bounded by the helix, means for forming said electron beam into a diverging electron beam, means for collimating the diverging electron beam for forming a cylindrical electron beam of cross sectional area substantially equal to that of said cylinder, the helix being positioned along the path of flow of the cylindrical electron beam, and means for immersing the path of flow of the cylindrical electron beam past the helix in an axial magnetic field for minimizing radial components of electron flow.

16. In a radio frequency device, means defining a longitudinal path of electron flow, said means including an electron emissive surface of predetermined area at one end of said path, an electrode system for forming the electrons emitted from said surface into a diverging electron beam for travel along a relatively short portion of said path, a lens system for collimating said diverging electron beam into a plane electron beam having a cross-sectional area substantially greater than the area of said emissive surface, magnetic means for maintaining the electron beam substantially plane along a relatively long portion of said path and means for modulating the plane electron beam in accordance with signal information.

17. A radio frequency device according to claim 16 in which the means for modulating the plane electron beam is a wave transmission circuit positioned along the relatively long portion of the path for propagating signal information.

18. In a radio frequency device, means defining a longitudinal path of electron flow, a source of electrons at one end of the path, an electrode system for forming the electrons into a diverging electron stream for travel along a relatively short initial portion of the path, a lens system for collimating said diverging electron beam into a solid circularly cylindrical electron beam for travel along a relatively longer portion of the path, and a helix wave circuit positioned along said relatively longer portion of the path in coupling relation with the solid circularly cylindrical electron beam, the internal diameter of the helix being substantially equal to the diameter of the solid circularly cylindrical electron beam and at least twice the diameter of said circular electron beam at the source end of the path.

19. In a radio frequency device which utilizes the interaction between a traveling wave and an electron beam, means including a cathode, a beam forming electrode, and an accelerating electrode spaced apart in the direction of electron flow from said cathode, for forming a divergent electron beam whose electron density decreases with increasing distance from said cathode, the cross-sectional area of the beam at the accelerating electrode being at least double the beam cross-sectional area at the cathode and a wave guiding structure positioned along the path of flow beyond said accelerating electrode for propagating the traveling wave.

20. In a radio frequency device which utilizes the interaction between an electromagnetic wave and an electron beam, means including in spaced succession, a cathode, a beam forming electrode, and an accelerating electrode, for forming a divergent electron beam whose electron density decreases progressively with increasing distance from said cathode, the cross-sectional area of said beam at the accelerating electrode being at least nine times its cross-sectional area at the cathode, and means positioned along the path of flow beyond said accelerating electrode for velocity modulating the electron beam.

*21. An electron gun for producing a solid, cylindrical Brillouin flow of electrons having a substantially constant predetermined final cross-sectional area along a predetermined path, said gun comprising a source of electrons disposed on said path for producing an electron stream having a predetermined initial cross-sectional area; means for producing an axial magnetic field along said path extending through said source; and means including an electron lens for directing electrons away from said source at a velocity to allow the space charge of said stream to expand the volume occupied by said stream outwards to a volume having a predetermined final circular cross-sectional area several times greater than said predetermined initial cross-sectional area of said electron stream whereby the outward expansion of said electrons in said axial magnetic field causes them to rotate about the longitudinal axis of said path.*

*22. An electron gun for producing a solid, cylindrical, Brillouin flow of electrons having a substantially constant predetermined final cross-sectional area along a predetermined path, said gun comprising a source of electrons disposed on said path for producing an electron stream, said stream having a predetermined initial cross-sectional area: means for producing an axial magnetic field along said path extending through said source; means for accelerating said electrons away from said source along a portion of said path at a velocity to allow the space charge of said stream to expand said stream outwards in said axial magnetic field whereby said stream electrons are caused to rotate about the longitudinal axis of said path; and means for producing an electron lens disposed subsequent to said portion of said path at a point where the radial forces acting upon said stream electrons are in equilibrium to reduce the radial velocity components of said stream electrons to zero at said point, the cross-sectional area of said stream being equal at said point to said predetermined final cross-sectional area.*

References Cited in the file of this patent or the original patent

UNITED STATES PATENTS

| | | |
|---|---|---|
| 2,575,383 | Field | Nov. 30, 1951 |
| 2,578,434 | Lindenblad | Dec. 11, 1951 |
| 2,608,668 | Hines | Aug. 26, 1952 |
| 2,632,130 | Hull | Mar. 17, 1953 |
| 2,817,035 | Birdsall | Dec. 17, 1957 |